United States Patent [19]

Nishina et al.

[11] Patent Number: 4,753,522
[45] Date of Patent: Jun. 28, 1988

[54] PLASTIC LENS ASSEMBLY FOR USE IN COPYING MACHINES

[75] Inventors: Kiichiro Nishina, Tokyo; Taira Kouchiwa, Kanagawa, both of Japan

[73] Assignee: Ricoh Company, Ltd., Tokyo, Japan

[21] Appl. No.: 866,919

[22] Filed: May 27, 1986

[30] Foreign Application Priority Data

Jun. 3, 1985 [JP]  Japan .................................. 60-118721
Jun. 6, 1985 [JP]  Japan .................................. 60-121584

[51] Int. Cl.$^4$ ............................ G02B 9/36; G02B 9/62
[52] U.S. Cl. ...................................... 350/470; 350/464
[58] Field of Search ................................. 350/464, 470

[56] References Cited

U.S. PATENT DOCUMENTS 3,865,470  2/1975  McCrobie et al. ............... 350/464 X
4,285,579  8/1981  Yamada ................................ 350/470
4,632,520  12/1986  Yamakawa ...................... 350/470 X

FOREIGN PATENT DOCUMENTS

2714497  12/1977  Fed. Rep. of Germany ...... 350/470

Primary Examiner—John K. Corbin
Assistant Examiner—Scott J. Sugarman
Attorney, Agent, or Firm—Oblon, Fisher, Spivak, McClelland & Maier

[57] ABSTRACT

A plastic lens assembly for use in a copying machine is a four-element configuration or a six-element configuration. The lens assembly has an aperture stop and is completely symmetrical with respect to the aperture stop. With the four-element lens assembly, all of the four lenses are made of plastics. Where the six-element lens design is employed, at least second through fifth lenses are made of plastics. The lens assembly are designed to sufficiently reduce variations in the focal length which would otherwise be caused by varying temperature and humidity.

3 Claims, 7 Drawing Sheets

PLASTIC LENS ASSEMBLY FOR USE IN COPYING MACHINES

BACKGROUND OF THE INVENTION

The present invention relates to a plastic lens assembly for use in a copying machine, and more particularly to a completely symmetrical lens assembly composed of plastic lenses.

There have been recent demands for smaller, lighter, and less costly lenses. To meet such demands, especially for lighter and more inexpensive lenses, a larger number of lenses are now made of plastics. Plastic are advantageous for use in lens in that plastic lens are of a small specific gravities and are inexpensive. However, the lenses of plastic materials are relatively unstable at varying temperature with the radius of curvature, the thickness, and the refractive index of such a plastic lens being subject to a large temperature-dependent changes. Furthermore, certain plastic material, such as polymethyl methylacrylate, are as susceptible to humidity as it is to temperature. Lenses made of such a plastic material are therefore problematic since their focal length tends to change as a function of either temperature and/or humidity. For these reasons, prior plastic lenses have been used primarily in limited applications such as optical systems with automatic focusing capability, e.g., an objective lens designed for focusing a laser beam onto a compact disc, and optical systems with relatively large tolerances, e.g., a viewfinder optical system.

Nevertheless, plastic materials are finding use in lens systems such as optical systems for copying machines where they are subject to heat and the conjugate length of the lens systems is kept constant. For example, Japanese Laid-Open Patent Publication No. 60(1985)-67915 discloses a five-element lens system, the four lenses of which are made of plastics. The disclosed lens system is however impractical because no consideration is given to humidity-dependent changes in optical properties, though it is temperature-compensated.

SUMMARY OF THE INVENTION

It is an object of the present invention to provide a plastic lens assembly for use in copying machines which has its focal length limited to very small changes dependent on humidity and temperature variations.

Another object of the present invention is to provide a plastic lens assembly for use in copying machines which has its focal length limited to very small changes dependent on humidity and temperature variations, and has chromatic aberration well compensated for.

The first object can be achieved by providing a four-element plastic lens assembly comprising, in order from an object side, a first biconvex lens, a second biconcave lens, an aperture stop, a third biconcave lens which is substantially identical to the second lens, and a fourth biconvex lens which is substantially identical to the first lens, the lens assembly being substantially completely symmetrical with respect to the aperture stop with, the first through fourth lenses being made of plastic and, the lens assembly meeting the following conditions:

$$0.18 < f1s/fs < 0.25 \quad (1)$$

$$-0.28 < f2s/fs < -0.19 \quad (2)$$

where fs: the composite focal length of the entire lens assembly at a reference temperature and humidity;

f1s: the focal length of the first and fourth lenses at a reference temperature and humidity; and f2s: the focal length of the second and third lenses at a reference temperature and humidity.

For minimizing the focal length variations caused by variations in temperature and humidity, it is necessary to cancel out the effects of changes in the powers of the positive and negative lenses. However, if only the focal length variations were taken into consideration, the image plane would become poor due to changes in the Petzval sum. By meeting the above conditions (1) and (2) the system balances the focal length and the Petzval sum. If the upper and lower limits of the conditions (1) and (2) were exceeded, the focal length variations caused by varying temperature and humidity or variations in the Petzval sum would be increased.

Where all of the lenses of a lens assembly for use in a copying machine are made of a plastic material, it is impossible to make the lens assembly sufficiently achromatic.

The second object of the present invention can be achieved by providing a six-element plastic lens assembly comprising, in order from an object side, a first positive meniscus lens having a convex surface directed toward the object side, a second negative meniscus lens having a convex surface directed toward the object side, a third position meniscus lens having a concave surface directed toward the object side, an aperture stop, a fourth lens substantially identical to the third lens and having a convex surface directed toward the aperture stop, a fifth lens substantially identical to the second lens and having a concave surface directed toward the aperture stop, and a sixth lens substantially identical to the first lens and having a convave surface directed toward the aperture stop, the lens assembly being substantially completely symmetrical with respect to the aperture stop, with the second through fifth lenses being made of plastic and wherein the lens assembly meets the following conditions:

$$-1.25 < f2s/fs < -0.9 \quad (3)$$

$$1.3 < f3s/fs < 1.7 \quad (4)$$

where fs: the composite focal length of the entire lens assembly at reference temperature and humidity;

f2s: the focal length of the second and fifth lenses at reference temperature and humidity; and f3s: the focal length of the third and fourth lenses at reference temperature and humidity.

For minimizing the focal length variations caused by varying temperature and humidity, it is necessary to cancel out the effects of changes in the powers of the positive and negative lenses. However, if only the focal length variations were taken into consideration, the image plane would become poor due to changes in the Petzval sum. By meeting the above conditions (3) and (4) the system balances the focal length and the Petzval sum. If the upper and lower limits of the conditions (3) and (4) were exceeded, the focal length variations caused by varying temperature and humidity or variations in the image plane would be increased.

For making the lens assembly achromatic, the first and six lenses are made of glass. The focal length f1 of the first and sixth lenses is determined from the conditions (3) and (4). Once the focal length f1 is determined, the Abbe number of the material of the first and sixth lenses is determined. The material which has the determined Abbe number among all materials available now for lenses is limited to glass. However, it is not essential for the first and fixth lenses to be made of glass, insofar as the required Abbe number is obtained.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Various symbols used in tables below are defined as follows:

$r_i$: the radius of curvature of a refracting surface;
$d_i$: the distance between adjacent refracting surfaces;
$n_i$: the refractive index of a lens material;
$\gamma_i$: the Abbe number of a lens material;
fs: the composite focal length at reference temperature and humidity;
f: the composite focal length at varied temperature and humidity;
w: half angle of view;
FNo: F number;
Y: the height of an object.

Figure 1:
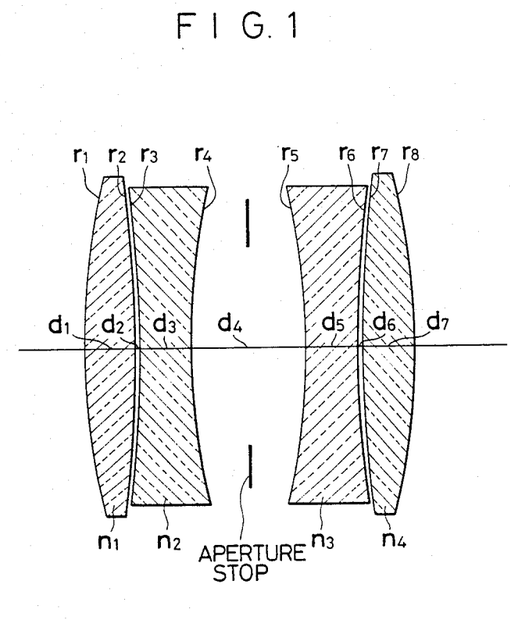
FIG. 1 is a schematic view of a four-element plastic lens assembly for a copying machine, according to an embodiment of the present invention.

FIG. 1 shows a four-element plastic lens assembly for use in a copying machine, according to an embodiment of the present invention.

The reference temperature and humidity for the lens assembly shown in FIG. 1 are 20° C. and 65%, respectively. The lens assembly comprises first through fourth lenses, the first and fourth lenses can be made of polycarbonate and the second and third lenses can be made of polymethyl methacrylate. The first and fourth lenses may however be made of other suitable materials such as polystylene. The lens assembly may be designed slightly out of completely symmetrical relationship to meet particular uses.

EXAMPLE 1

[1] At a standard reference temperature and humidity (20° C. and 65%):

| fs = 99.990 mm | | FNo = 16 w = 22° |
|---|---|---|
| f1s = 24.202 mm | | f2s = −26.152 mm |
| $r_1$ = 20.957 | $d_1$ = 1.574 | $n_1$ = 1.58972 |
| $r_2$ = −43.498 | $d_2$ = 0.145 | |
| $r_3$ = −34.956 | $d_3$ = 1.539 | $n_2$ = 1.49394 |
| $r_4$ = 20.787 | $d_4$ = 3.480 | |
| $r_5$ = −20.787 | $d_5$ = 1.539 | $n_3$ = 1.49394 |

-continued

| $r_6$ = 34.956 | $d_6$ = 0.145 | |
| $r_7$ = 43.498 | $d_7$ = 1.574 | $n_4$ = 1.58972 |
| $r_8$ = −20.957 | | |

The values of the conditions (1) and (2) at this time are:

$$0.18 < f_{1s}/f_s < 0.25 \; f_{1s}/f_s = 0.242 \quad (1)$$

$$-0.28 < f_{2s}/f_s < -0.19 \; f_{2s}/f_s = -0.262 \quad (2)$$

[2] At high temperature and humidity (70° C., 95%):

| f = 100.040 mm FNo = 16 w = 22° | | |
|---|---|---|
| $r_1$ = 21.041 | $d_1$ = 1.580 | $n_1$ = 1.58270 |
| $r_2$ = −43.672 | $d_2$ = 0.145 | |
| $r_3$ = −35.101 | $d_3$ = 1.545 | $n_2$ = 1.48685 |
| $r_4$ = 20.873 | $d_4$ = 3.480 | |
| $r_5$ = −20.873 | $d_5$ = 1.545 | $n_3$ = 1.48685 |
| $r_6$ = 35.101 | $d_6$ = 0.145 | |
| $r_7$ = 43.672 | $d_7$ = 1.580 | $n_4$ = 1.58270 |
| $r_8$ = −21.041 | | |

[2] At low temperature and humidity (−40° C., 5%):

| f = 99.981 mm FNo = 16 w = 22° | | |
|---|---|---|
| $r_1$ = 20.856 | $d_1$ = 1.566 | $n_1$ = 1.59814 |
| $r_2$ = −43.289 | $d_2$ = 0.145 | |
| $r_3$ = −34.723 | $d_3$ = 1.529 | $n_2$ = 1.50163 |
| $r_4$ = 20.649 | $d_4$ = 3.480 | |
| $r_5$ = −20.649 | $d_5$ = 1.529 | $n_3$ = 1.50163 |
| $r_6$ = 34.723 | $d_6$ = 0.145 | |
| $r_7$ = 43.289 | $d_7$ = 1.566 | $n_4$ = 1.59814 |
| $r_8$ = −20.856 | | |

The focal lengths and the conjugate lengths under the respective temperature and humidity conditions are given below:

| | [1] 20° C., 65% | [2] 70° C., 95% | [3] − 40° C., 5% |
|---|---|---|---|
| Focal length (mm) | 99.990 | 100.040 | 99.981 |
| Conjugate length (mm) | 398.359 | 398.359 | 398.359 |

Figure 2:
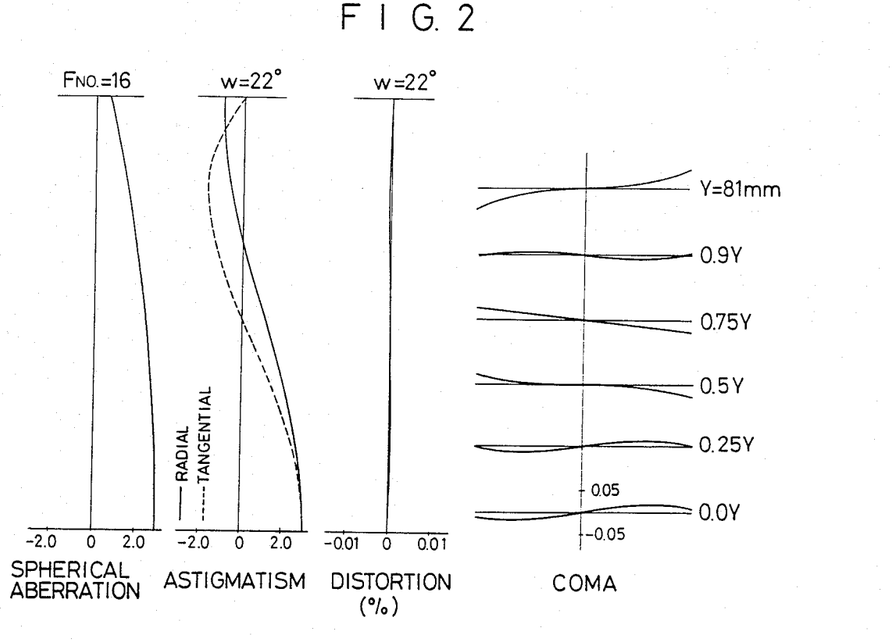
FIGS. 2 through 7 are diagrams showing aberrations and MTF curves of a lens example constructed according to the embodiment of FIG. 1.
Figure 3:
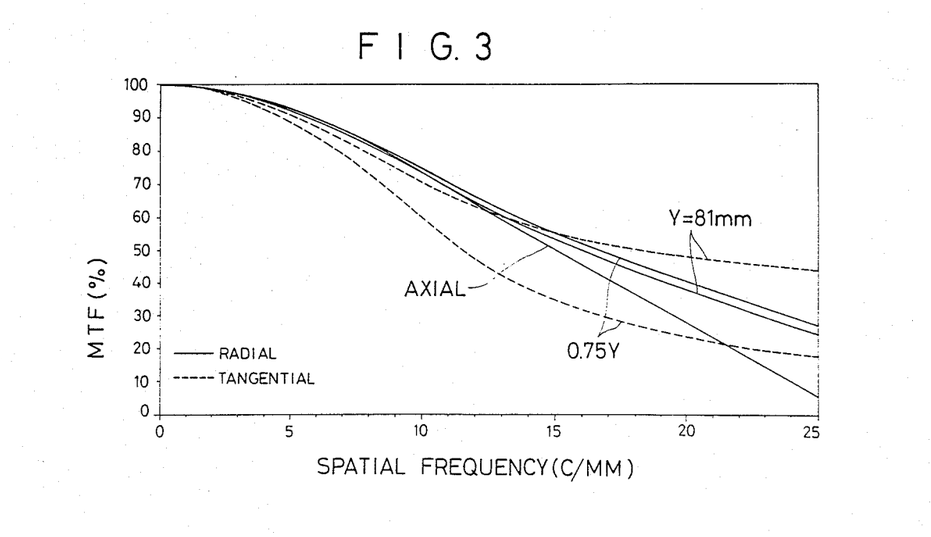
Figure 4:
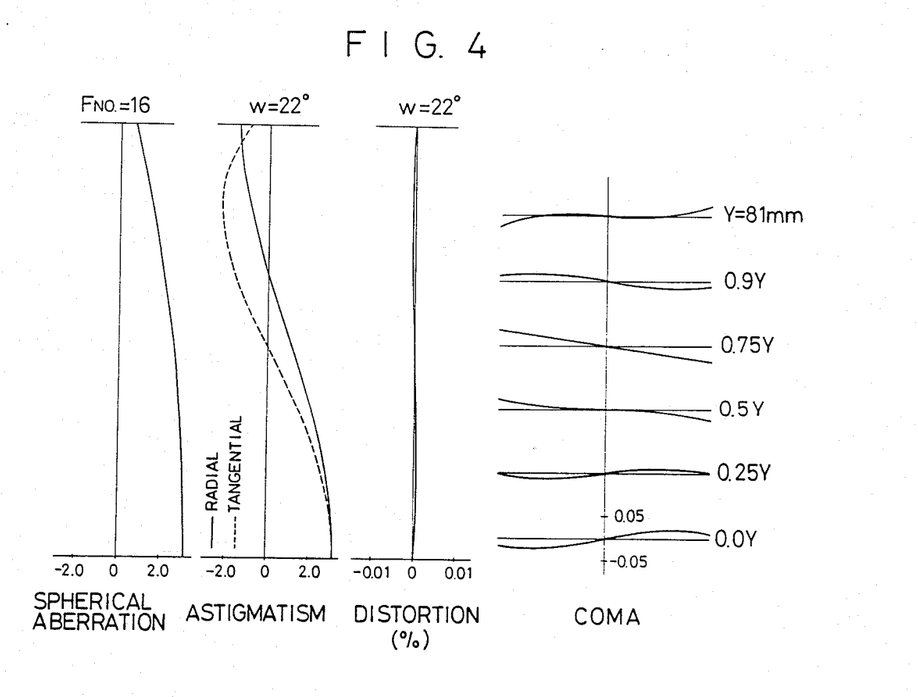
Figure 5:
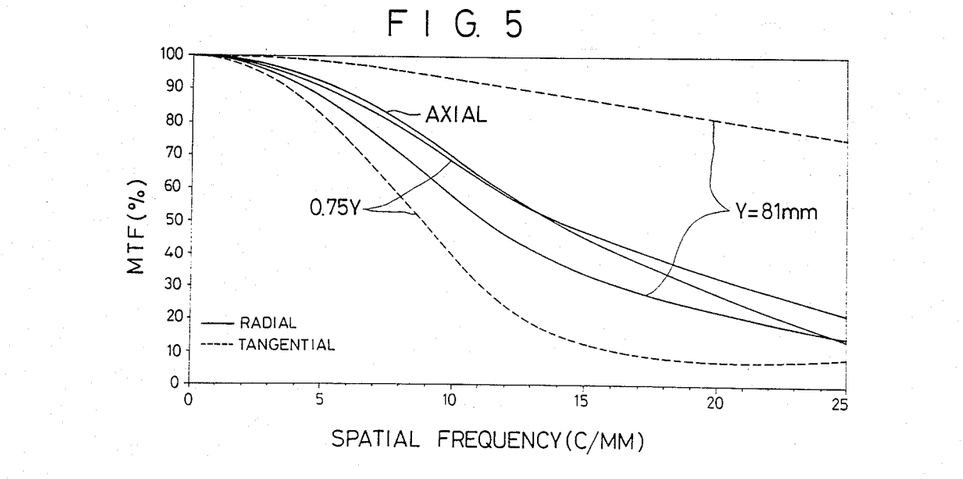
Figure 6:
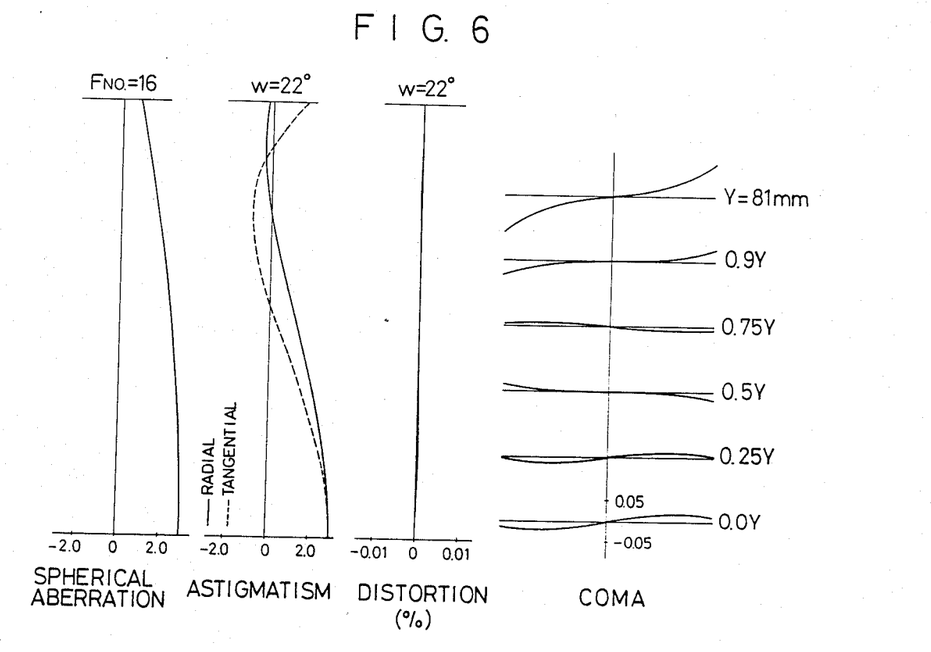
Figure 7:
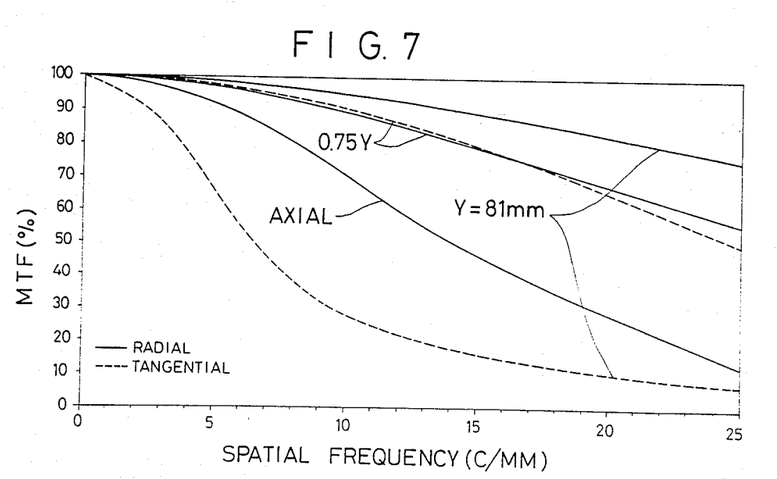

FIGS. 2 and 3 show aberration curves and MTF curves of the above example under the reference temperature and humidity conditions (20° C., 65%). As is apparent from these graphs, the axial and off-axis aberrations are corrected in good balance, and the MTF % is kept the high up to high spatial frequencies. FIGS. 4 and 5 illustrate aberration curves and MTF curves of the above example under the high temperature and humidity conditions (70° C., 95%), and FIGS. 6 and 7 illustrate aberration curves and MTF curves of the above example under the low temperature and humidity conditions (−40° C., 5%). Under the worst combined temperature and humidity conditions, the conjugate length remains the same, as that under the standard reference temperature and humidity conditions.

While the four-element lens assembly is composed of a small number of lenses, the lenses are all made of plastics and designed for minimizing changes in the focal lengths and various aberrations under different temperatures and humidities. As a consequence, the lens assembly has good performance when used in any environments, and can be used as a lens for copying machines while remaining lightweight and inexpensive.

Figure 8:
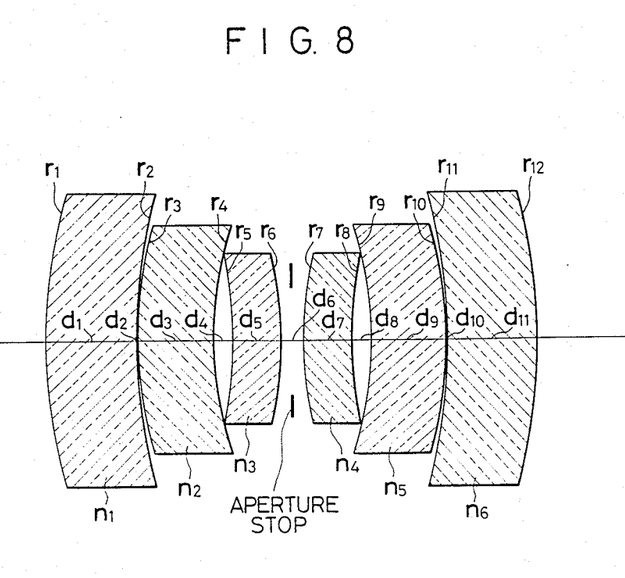
FIG. 8 is a schematic view of a six-element plastic lens assembly for a copying machine, according to another embodiment of the present invention.

FIG. 8 shows a six-element plastic lens assembly for use in a copying machine, according to another embodiment of the present invention.

The reference temperature and humidity for the lens assembly shown in FIG. 8 are 20° C. and 65%, respectively. The lens assembly comprises first through sixth lenses, with the second and fifth lenses being made of polycarbonate and the third and fourth lenses being made of polymethyl methacrylate. The second and fifth lenses may however be made of other suitable materials such as polystyrene. The lens assembly may be designed slightly out of complete symmetry to meet particular uses.

EXAMPLE 2

[1] At a reference temperature and humidity (20° C. and 65%):

| fs = 100.003 mm | | FNo = 16 w = 22° | Y = 81 mm |
| --- | --- | --- | --- |
| f2s = −114.710 mm | | f3s = 148.2 mm | |
| $r_1 = 24.183$ | $d_1 = 4.831$ | $n_1 = 1.64000$ | $v_1 = 60.09$ |
| $r_2 = 30.987$ | $d_2 = 0.077$ | | |
| $r_3 = 25.489$ | $d_3 = 3.946$ | $n_2 = 1.58500$ | $v_2 = 29.30$ |
| $r_4 = 17.417$ | $d_4 = 0.659$ | | |
| $r_5 = -33.588$ | $d_5 = 2.825$ | $n_3 = 1.49200$ | $v_3 = 60.50$ |
| $r_6 = -23.633$ | $d_6 = 1.316$ | | |
| $r_7 = 23.633$ | $d_7 = 2.825$ | $n_4 = 1.49200$ | $v_4 = 60.50$ |
| $r_8 = 33.588$ | $d_8 = 0.659$ | | |
| $r_9 = -17.417$ | $d_9 = 3.946$ | $n_5 = 1.58500$ | $v_5 = 29.30$ |
| $r_{10} = -25.489$ | $d_{10} = 0.077$ | | |
| $r_{11} = -30.987$ | $d_{11} = 4.831$ | $n_6 = 1.64000$ | $v_6 = 60.09$ |
| $r_{12} = -24.183$ | | | |

The values of the conditions (3) and (4) at this time are:

$$-1.25 < f2s/fs < -0.9 \quad f2s/fs = -1.147 \quad (3)$$

$$1.3 < f3s/fs < -1.7 \quad f3s/fs = 1.482 \quad (4)$$

[2] At high temperature and humidity (70° C., 95%):

| f = 100.084 mm FNo = 16 w = 22° Y = 81 mm | | |
| --- | --- | --- |
| $r_1 = 24.183$ | $d_1 = 4.831$ | $n_1 = 1.64000$ |
| $r_2 = 30.987$ | $d_2 = 0.077$ | |
| $r_3 = 25.591$ | $d_3 = 3.962$ | $n_2 = 1.57798$ |
| $r_4 = 17.487$ | $d_4 = 0.659$ | |
| $r_5 = -33.728$ | $d_5 = 2.837$ | $n_3 = 1.48491$ |
| $r_6 = -23.731$ | $d_6 = 1.316$ | |
| $r_7 = 23.731$ | $d_7 = 2.837$ | $n_4 = 1.48491$ |
| $r_8 = 33.728$ | $d_8 = 0.659$ | |
| $r_9 = -17.487$ | $d_9 = 3.962$ | $n_5 = 1.57798$ |
| $r_{10} = -25.591$ | $d_{10} = 0.077$ | |
| $r_{11} = -30.987$ | $d_{11} = 4.831$ | $n_6 = 1.64000$ |
| $r_{12} = -24.183$ | | |

[3] At low temperature and humidity (−40° C., 5%):

| f = 99.910 mm FNo = 16 w = 22° Y = 81 mm | | |
| --- | --- | --- |
| $r_1 = 24.183$ | $d_1 = 4.831$ | $n_1 = 1.64000$ |
| $r_2 = 30.987$ | $d_2 = 0.077$ | |
| $r_3 = 25.367$ | $d_3 = 3.927$ | $n_2 = 1.59342$ |
| $r_4 = 17.333$ | $d_4 = 0.659$ | |
| $r_5 = -33.364$ | $d_5 = 2.806$ | $n_3 = 1.49969$ |
| $r_6 = -23.476$ | $d_6 = 1.316$ | |
| $r_7 = 23.476$ | $d_7 = 2.806$ | $n_4 = 1.49969$ |
| $r_8 = 33.364$ | $d_8 = 0.659$ | |
| $r_9 = -17.233$ | $d_9 = 3.927$ | $n_5 = 1.59342$ |
| $r_{10} = -25.367$ | $d_{10} = 0.077$ | |
| $r_{11} = -30.987$ | $d_{11} = 4.831$ | $n_6 = 1.64000$ |
| $r_{12} = -24.183$ | | |

The focal lengths and the conjugate lengths under the respective temperature and humidity conditions are given below:

| | [1] 20° C., 65% | [2] 70° C., 95% | [3] −40° C., 5% |
| --- | --- | --- | --- |
| Composite focal length (mm) | 100.003 | 100.084 | 99.910 |
| Conjugate length (mm) | 403.630 | 403.629 | 403.630 |

Figure 9:
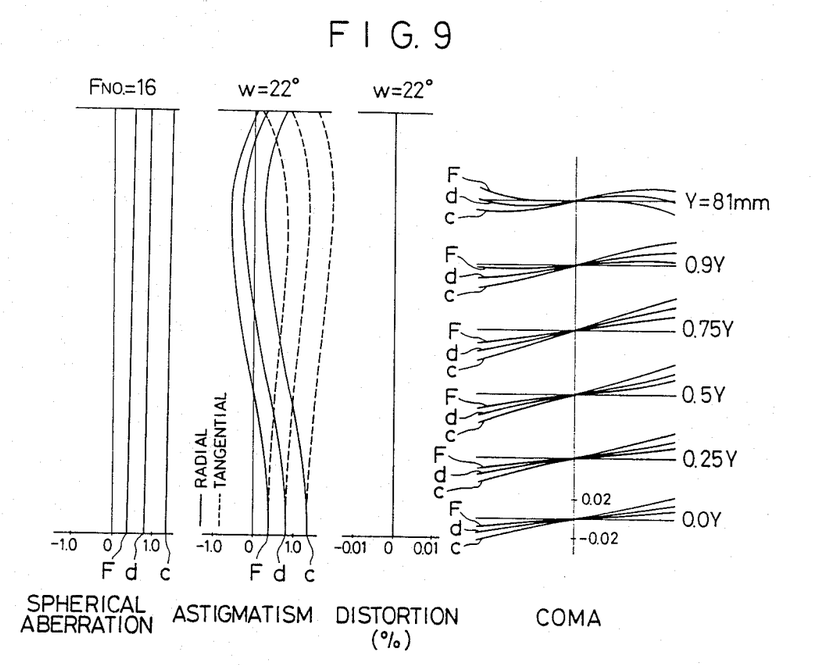
FIGS. 9 through 14 are diagrams showing aberrations and MTF curves of a lens example constructed according to the embodiment of FIG. 8.
Figure 10:
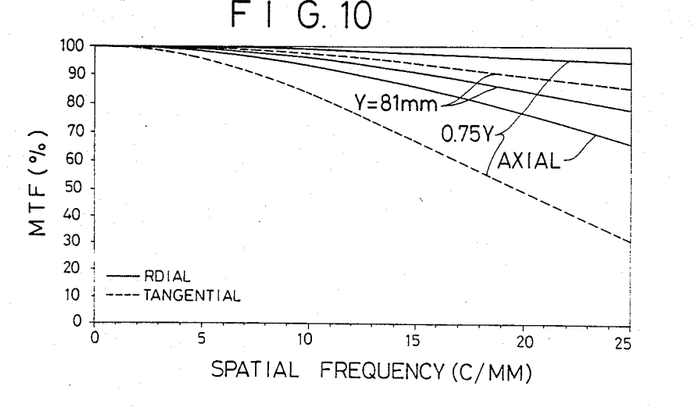
Figure 11:
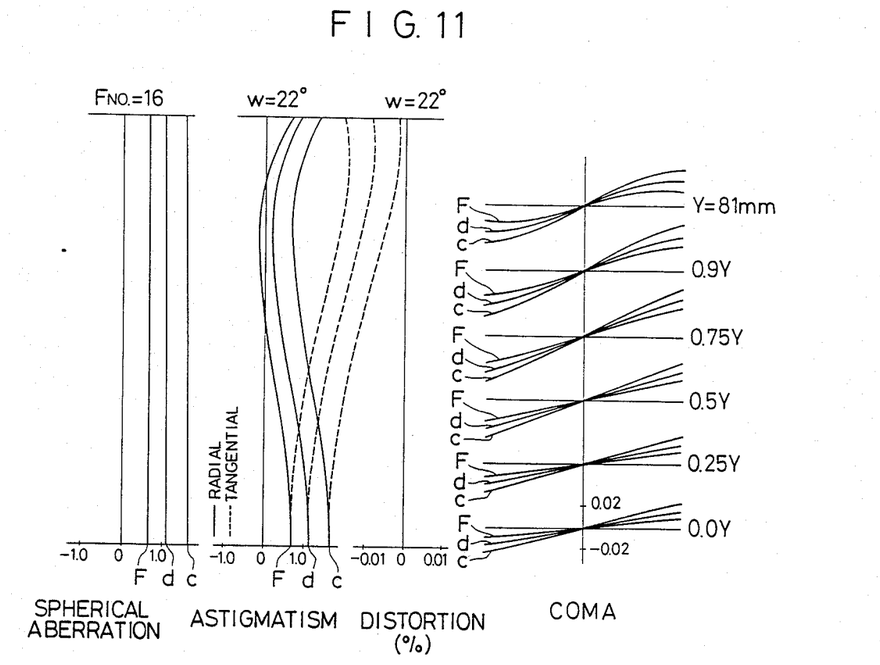
Figure 12:
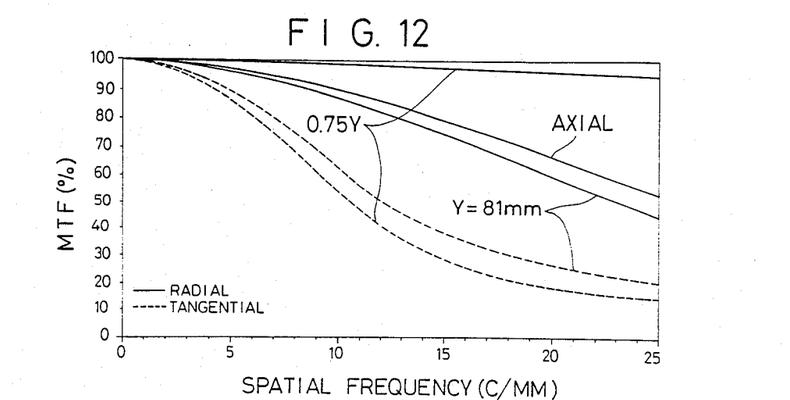
Figure 13:
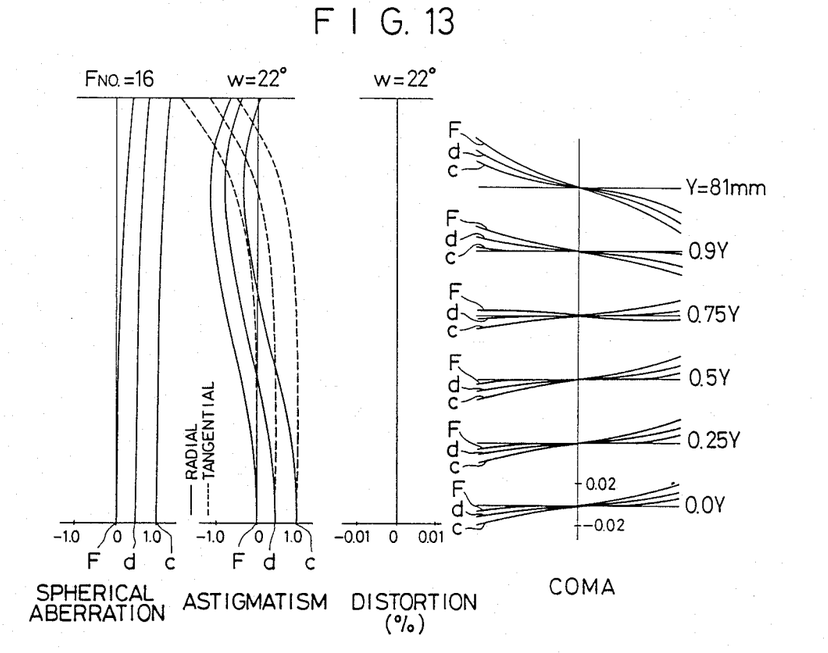
Figure 14:
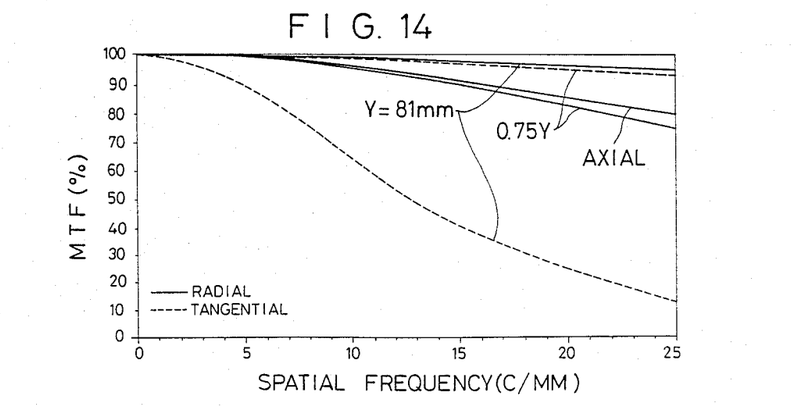

FIGS. 9 and 10 show the aberration curves and the MTF curves of the above example 2 under the standard reference temperature and humidity conditions (20° C., 65%). As is apparent from these graphs, the axial and off-axis aberrations are corrected so as to be in good balance, and with the MTF % being kept high up to the high spatial frequencies. FIGS. 11 and 12 illustrate the aberration curves and the MTF curves of the example 2 under the high temperature and humidity conditions (70° C., 95%), and FIGS. 13 and 14 illustrate aberration curves and MTF curves of the example 2 under the low temperature and humidity conditions (−40° C., 5%). Under the worst combined temperature and humidity conditions, the conjugate length remains the same as that under the reference temperature and humidity conditions.

The six-element lens assembly is designed for minimizing changes in the focal lengths and various aberrations, which would be caused by plastics materials under different temperatures and humidities. As a consequence, the lens assembly has good performance when used in any environments, and can be used as an optical lens system in an existing copying machine. According to the present invention, therefore, plastic materials can be used as lens materials in more applications.

Although certain preferred embodiments have been shown and described, it should be understood that many changes and modifications may be made therein without departing from the scope of the appended claims.

What is claimed is:

1. A four-element plastic lens assembly for use in a copying machine, comprising, in order from an object side, a first biconvex lens, a second biconcave lens, an aperture stop, a third biconcave lens which is substantially identical to said second lens, and a fourth biconvex lens which is substantially identical to said first lens, said lens assembly being substantially completely symmetrical with respect to said aperture stop, said first and fourth lenses being made of polycarbonate, and said second and third lenses being made of polymethyl methacrylate, said lens assembly meeting the following conditions:

$$0.18 < f1s/fs < 0.25$$

-continued
$$-0.28 < f2s/fs < -0.19$$

where
- fs: the composite focal length of the entire lens assembly at reference temperature and humidity;
- f1s: the focal length of the first and fourth lenses at reference temperature and humidity; and
- f2s: the focal length of the second and third lenses at reference temperature and humidity;

wherein assuming that $r_i$: the radius of curvature of a refracting surface, $d_i$: the distance between adjacent refracting surfaces, $n_i$: the refractive index of a lens material, w: half angle of view, FNo: F number, and Y: the height of an object, said lens assembly has the following numerical values at a temperature of 20° C. and a humidity of 65%:

| fs = 99.990 mm | FNo = 16 | w = 22° |
|---|---|---|
| f1s = 24.202 mm | f2s = −26.152 mm | |
| f1s/fs = 0.242, | f2s/fs = −0.262 | |
| $r_1 =$ 20.957 | $d_1 =$ 1.574 | $n_1 =$ 1.58972 |
| $r_2 =$ −43.498 | $d_2 =$ 0.145 | |
| $r_3 =$ −34.956 | $d_3 =$ 1.539 | $n_2 =$ 1.49394 |
| $r_4 =$ 20.787 | $d_4 =$ 3.480 | |
| $r_5 =$ −20.787 | $d_5 =$ 1.539 | $n_3 =$ 1.49394 |
| $r_6 =$ 34.956 | $d_6 =$ 0.145 | |
| $r_7 =$ 43.498 | $d_7 =$ 1.574 | $n_4 =$ 1.58972 |
| $r_8 =$ −20.957. | | |

2. A six-element plastic lens assembly for use in a copying machine, comprising, in order from an object side, a first positive meniscus lens having a convex surface directed toward the object side, a second negative meniscus lens having a convex surface directed toward the object side, a third positive meniscus lens having a concave surface directed toward the object side, an aperture stop, a fourth lens substantially identical to said third lens and having a convex surface directed toward said aperture stop, a fifth lens substantially identical to said second lens and having a concave surface directed toward said aperture stop, and a sixth lens substantially identical to said first lens and having a concave surface directed toward said aperture stop, said lens assembly being substantially completely symmetrical with respect to said aperture stop, said second through fifth lenses being made of plastics, said lens assembly meeting the following conditions:

$$-1.25 < f2s/fs < -0.9 \quad (3)$$

$$1.3 < f3s/fs < 1.7 \quad (4)$$

where
- fs: the composite focal length of the entire lens assembly at a standard reference temperature and humidity;
- f2s: the focal length of the second and fifth lenses at a standard reference temperature and humidity; and
- f3s: the focal length of the third and fourth lenses at a standard reference temperature and humidity.

3. A six-element plastic lens assembly according to claim 2, wherein said second and fifth lenses are made of polycarbonate, and said third and fourth lenses are made of polymethyl methacrylate, and wherein assuming that $r_i$: the radius of curvature of a refracting surface, $d_i$: the distance between adjacent refracting surfaces, $n_i$: the refractive index of a lens material, $\gamma_i$: the Abbe number of a lens material, w: half angle of view, FNo: F number, and Y: the height of an object, said lens assembly has the following numerical values at a temperature of 20° C. and a humidity of 65%:

| fs = 100.003 mm | FNo = 16 | w = 22° | Y = 81 mm |
|---|---|---|---|
| f2s = −114.710 mm | f3s = 148.2 mm | | |
| f2s/fs = −1.147 | f3s/fs = 1.482 | | |
| $r_1 =$ 24.183 | $d_1 =$ 4.831 | $n_1 =$ 1.64000 | $\nu_1 =$ 60.09 |
| $r_2 =$ 30.987 | $d_2 =$ 0.077 | | |
| $r_3 =$ 25.489 | $d_3 =$ 3.946 | $n_2 =$ 1.58500 | $\nu_2 =$ 29.30 |
| $r_4 =$ 17.417 | $d_4 =$ 0.659 | | |
| $r_5 =$ −33.588 | $d_5 =$ 2.825 | $n_3 =$ 1.49200 | $\nu_3 =$ 60.50 |
| $r_6 =$ −23.633 | $d_6 =$ 1.316 | | |
| $r_7 =$ 23.633 | $d_7 =$ 2.825 | $n_4 =$ 1.49200 | $\nu_4 =$ 60.50 |
| $r_8 =$ 33.588 | $d_8 =$ 0.659 | | |
| $r_9 =$ −17.417 | $d_9 =$ 3.946 | $n_5 =$ 1.58500 | $\nu_5 =$ 29.30 |
| $r_{10} =$ −25.489 | $d_{10} =$ 0.077 | | |
| $r_{11} =$ −30.987 | $d_{11} =$ 4.831 | $n_6 =$ 1.64000 | $\nu_6 =$ 60.09 |
| $r_{12} =$ −24.183. | | | |

* * * * *